United States Patent
Ramaraju et al.

(10) Patent No.: US 9,528,883 B2
(45) Date of Patent: Dec. 27, 2016

(54) TEMPERATURE SENSOR CIRCUITRY WITH SCALED VOLTAGE SIGNAL

(71) Applicant: Freescale Semiconductor, Inc., Austin, TX (US)

(72) Inventors: Ravindraraj Ramaraju, Round Rock, TX (US); David R. Bearden, Austin, TX (US); Sunitha Manickavasakam, Austin, TX (US); Venkataram M. Mooraka, Austin, TX (US); Hector Sanchez, Cedar Park, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 374 days.

(21) Appl. No.: 14/258,629

(22) Filed: Apr. 22, 2014

(65) Prior Publication Data

US 2015/0300889 A1 Oct. 22, 2015

(51) Int. Cl.
*G01K 7/01* (2006.01)
*G05F 3/30* (2006.01)

(52) U.S. Cl.
CPC .. *G01K 7/01* (2013.01); *G05F 3/30* (2013.01)

(58) Field of Classification Search
USPC .................................................. 374/170–171
See application file for complete search history.

(56) References Cited

U.S. PATENT DOCUMENTS

| 5,317,287 A | 5/1994 | Brown |
| 5,546,041 A | 8/1996 | Szajda |
| 5,899,570 A | 5/1999 | Darmawaskita et al. |
| 5,977,813 A | 11/1999 | Boerstler |
| 6,011,422 A | 1/2000 | Koglin et al. |

(Continued)

OTHER PUBLICATIONS

Aita et al., "Low-Power CMOS Smart Temperature Sensor With a Batch-Calibrated Inaccuracy of ±0.25° C. (±3σ) from −70° C.," IEEE Sensors Journal, vol. 13, No. 5, May 2013, pp. 1840-1848.

(Continued)

*Primary Examiner* — Minh Phan
*Assistant Examiner* — Leon W Rhodes, Jr.

(57) ABSTRACT

Temperature sensing circuitry implemented on a semiconductor integrated circuit that senses the temperature at a site, digitizes the sensed temperature, and then outputs a signal representing such a sensed temperature. The temperature sensing circuitry converts a voltage signal that is proportional to the temperature to a frequency-based signal, which is converted to a digital bit value. A scalar factor is applied to another voltage signal that is inversely proportional to the temperature to produce a scaled voltage signal. The scaled voltage signal is converted to a second frequency-based signal, which is converted to a digital bit value, and then the two digital bit values are compared. The temperature is determined when the digital bit values substantially match.

19 Claims, 11 Drawing Sheets

(56) References Cited

U.S. PATENT DOCUMENTS

| | | | |
|---|---|---|---|
| 6,078,208 | A | 6/2000 | Nolan et al. |
| 6,097,239 | A | 8/2000 | Miranda, Jr. et al. |
| 6,160,305 | A | 12/2000 | Sanchez |
| 6,612,502 | B2 | 9/2003 | Poucher |
| 6,869,216 | B1 | 3/2005 | Holloway et al. |
| 7,078,955 | B2 | 7/2006 | Kim et al. |
| 7,140,767 | B2 | 11/2006 | McLeod et al. |
| 7,202,696 | B1 | 4/2007 | Taheri |
| 7,331,708 | B2 * | 2/2008 | Blom .................. G01K 7/01 327/513 |
| 7,429,129 | B2 | 9/2008 | St. Pierre et al. |
| 7,524,109 | B2 | 4/2009 | Gardner et al. |
| 7,532,056 | B2 | 5/2009 | Seo |
| 7,579,898 | B2 | 8/2009 | Soldera et al. |
| 7,581,881 | B2 | 9/2009 | Kim et al. |
| 7,636,009 | B2 | 12/2009 | Jo et al. |
| 7,808,068 | B2 | 10/2010 | Hartley |
| 7,887,235 | B2 | 2/2011 | Campos et al. |
| 7,920,015 | B2 | 4/2011 | Chellappa |
| 7,953,569 | B2 | 5/2011 | Jeong |
| 8,262,286 | B2 | 9/2012 | Peterson et al. |
| 8,308,358 | B2 | 11/2012 | Doorenbos |
| 8,432,214 | B2 | 4/2013 | Olmos et al. |
| 8,475,039 | B2 | 7/2013 | Chern et al. |
| 2011/0255568 | A1 | 10/2011 | Swei |
| 2012/0104229 | A1 * | 5/2012 | Kwon .................. G01J 5/22 250/208.1 |
| 2013/0121377 | A1 | 5/2013 | Furuichi |
| 2014/0086279 | A1 | 3/2014 | Cao et al. |

OTHER PUBLICATIONS

Kim, Chan-Kyung et al., "CMOS Temperature-Sensor with Ring Oscillator for Mobile DRAM Self-refresh Control." 2008 IEEE. 978-1-4244-1684-4/08, pp. 3094-3097.

Sebastiano, F. et al., A 1.2V 10μW NPN-Based Temperature Sensor in 65nm CMOS with an Inaccuracy of ±0.2° C. (3o) from −70° C. to 125° C. © 2010 IEEE International Solid-State Circuits Conference, pp. 1-28.

Andreou et al., "A Novel Wide-Temperature-Range, 3.9 ppm/° C. CMOS Bandgap Reference Circuit," IEEE Journal of Solid-State Circuits, vol. 47, No. 2, pp. 574-581, Feb. 2012.

Duarte et al., "Temperature Sensor Design in a High Volume Manufacturing 65nm CMOS Digital Process," IEEE 2007 Custom Integrated Circuits Conference (CICC), pp. 221-224, 2007.

Jeong et al., "Process Compensated CMOS Temperature Sensor for Microprocessor Application," School of Electrical and Computer Engineering, Georgia Institute of Technology, pp. 3118-3121, Atlanta, Georgia, 2012.

Kim et al., "A Smart Temperature Sensor with an Internal CMOS Bandgap Reference Circuit and Clock Oscillators," Center for Distributed Sensor Networks, Gwangju Institute of Science and Technology (GIST), 261 Cheomdan-gwagiro, Buk-gu, Gwangju 500-712, Korea, 2008.

U.S. Appl. No. 13/628,939, filed Sep. 27, 2012.
U.S. Appl. No. 13/628,814, filed Sep. 27, 2012.
U.S. Appl. No. 13/628,814, Sanchez, H., "Thermal Sensor System and Method Based on Current Ratio", Office Action—Notice of Allowance, mailed Jun. 30, 2015.

* cited by examiner

TEMPERATURE SENSOR CIRCUITRY WITH SCALED VOLTAGE SIGNAL

TECHNICAL FIELD

The present invention is related in general to temperature sensor circuitry, and in particular, to temperature sensor circuitry implemented within electronic circuitry.

BACKGROUND

It has become increasingly important to monitor temperatures on an integrated circuit ("IC") die, or chip. For example, it is important to manage the on-die temperature in a multi-core SOC ("system on chip") due to issues pertaining to the positive feedback mechanism associated with leakage current and temperature, in that leakage current results in increases in temperature within the die circuitry. A temperature sensor can be used to monitor the temperature of an electronic component, such as a CPU ("central processing unit"), GPU ("graphics processing unit"), MPU ("microprocessor unit"), SOC ("system on chip"), etc. When the temperature exceeds predetermined thresholds, the sensor may alert circuitry to slow down or even shut down the electronic component to reduce power consumption and thus reduce the temperature so that overheating that can cause destructive failure to the component may be prevented.

Typically, temperature sensors include a reference circuitry and a temperature measuring circuitry, wherein the temperature dependency is either proportional to absolute temperature ("PTAT"), that is, the measuring circuit outputs a voltage that increases in proportion to a temperature rise (i.e., has a positive temperature coefficient), or complementary to absolute temperature ("CTAT"), that is, the measuring circuit outputs a voltage that drops in proportion to a temperature rise (i.e., has a negative temperature coefficient). Further, DAC ("digital to analog converter") based temperature sensors have been implemented relying on comparing a PTAT voltage and a CTAT base-emitter voltage. This approach, however, has suffered from DAC code-to-temperature non-linearity issues, i.e., it cannot achieve good linearity over a wide temperature range, resulting in poor temperature measurement accuracy.

DETAILED DESCRIPTION

Aspects of the present invention essentially provide temperature sensing circuitry implemented on a semiconductor integrated circuit that senses the temperature at a site, digitizes the sensed temperature, and then outputs a signal representing such a sensed temperature. The temperature sensing circuitry converts a voltage signal that is proportional to the temperature to a frequency-based signal, which is converted to a digital bit value. A scalar factor is applied to another voltage signal that is inversely proportional to the temperature to produce a scaled voltage signal. The scaled voltage signal is converted to a second frequency-based signal, which is converted to a digital bit value, and then the two digital bit values are compared. The temperature is determined when the digital bit values substantially match.

Figure 1:
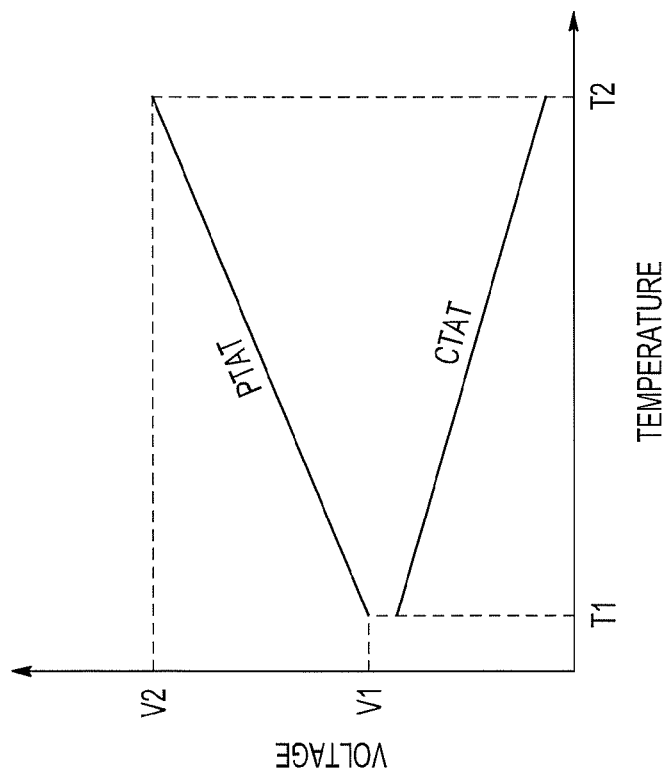
FIG. 1 illustrates an exemplary plot of the relationships of PTAT and CTAT to temperature.

FIG. 1 illustrates an exemplary plot showing the relationships of PTAT and CTAT voltages to temperatures (e.g., operational temperatures of electronic circuitry in which a temperature sensor circuitry configured in accordance with the present invention would be implemented). As will be further disclosed hereinafter, circuitry within the temperature sensor circuitry outputs a voltage (for a fixed current) that increases in proportion to a temperature rise or has a positive temperature coefficient, within a portion of the overall electronic circuitry in which a temperature sensor circuitry is implemented. Such a temperature dependency is referred to as being proportional to absolute temperature ("PTAT"). The temperature sensor circuitry will also produce a voltage that drops in proportion to a temperature rise, or has a negative temperature coefficient, within the electronic circuitry being measured, and is referred to as the complementary to absolute temperature ("CTAT") voltage. The exemplary plot of FIG. 1 illustrates how the PTAT voltage signal increases from voltage V1 to voltage V2 as the temperature increases from temperature T1 to temperature T2.

Figure 2:
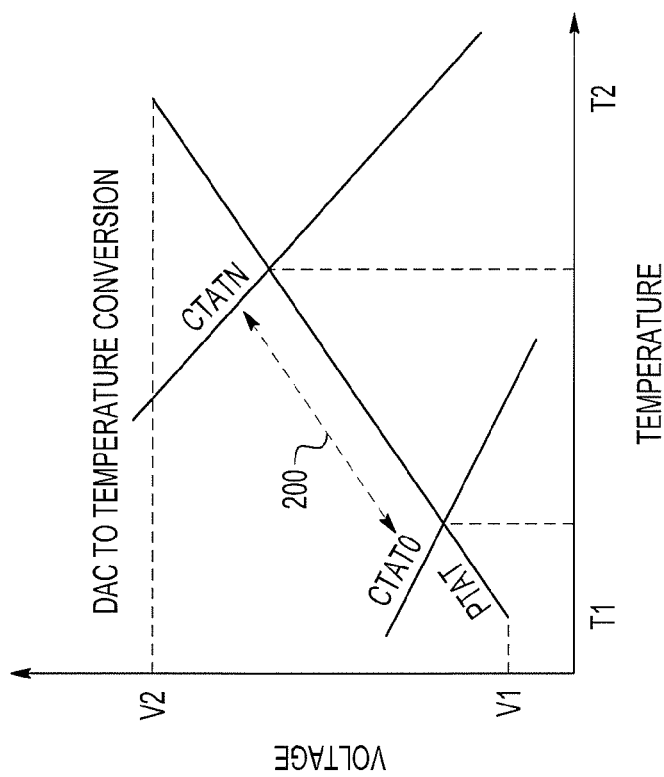
FIG. 2 illustrates an exemplary plot showing a DAC to temperature conversion using PTAT and CTAT.
Figure 5:
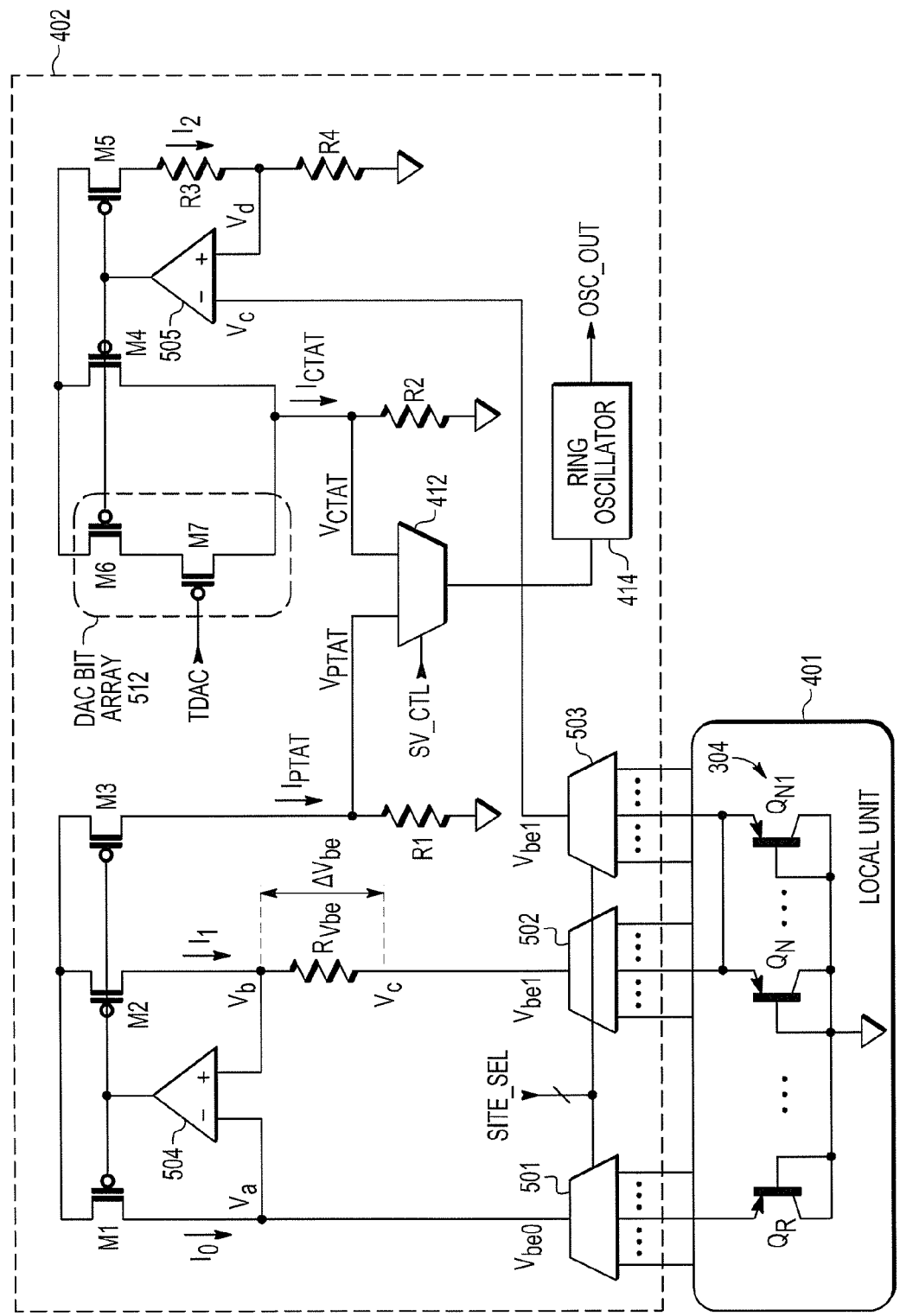
FIG. 5 illustrates electronic circuitry for conversion of a sensed temperature to a voltage value.

As further described with respect to FIG. 5, embodiments of the present invention essentially provide PTAT and CTAT generation circuitry, wherein the PTAT voltage generation circuitry is used to also generate the CTAT voltage signal, so that the PTAT and CTAT voltage signals track each other. As depicted in FIG. 2, embodiments of the present invention then utilize intersections of the PTAT and CTAT voltage signals as a direct measure of the temperature that is being sensed within a portion of the electronic circuitry in which the temperature sensor circuitry has been implemented. In embodiments of the present invention, a single PTAT line is used for the reference across the entire temperature range.

Figure 3:
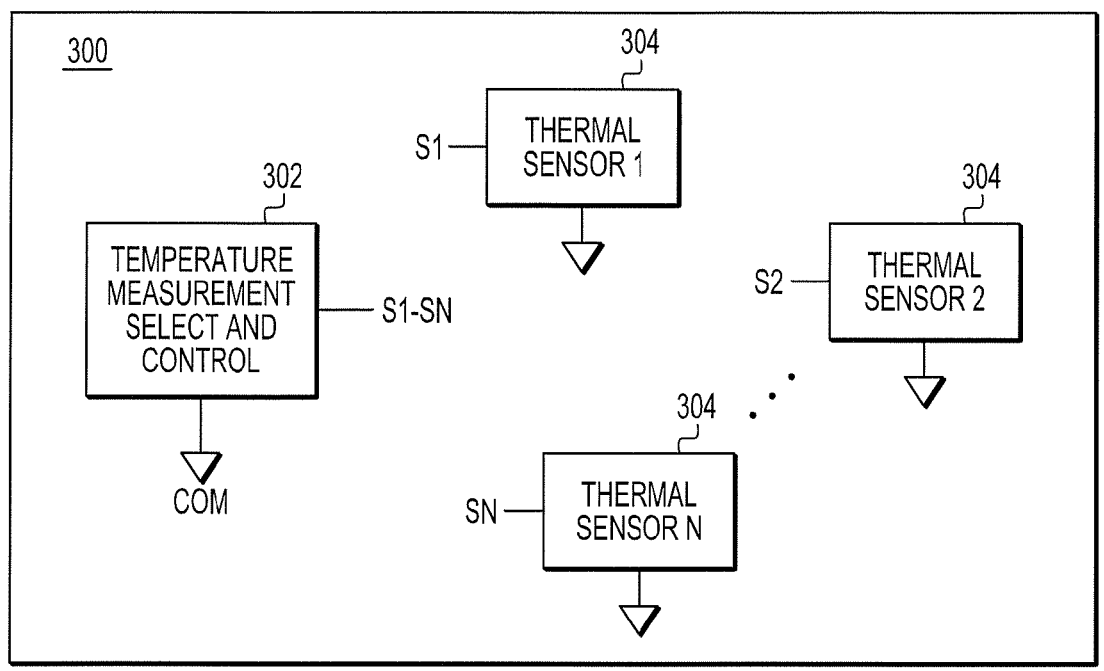
FIG. 3 illustrates an exemplary electronic circuitry configured in accordance with embodiments of the present invention.

FIG. 3 illustrates a simplified block diagram of an exemplary electronic system 300 in which temperature sensor circuitry configured in accordance with embodiments of the present invention has been implemented. The electronic system 300 may comprise any type of electronic component, such as a CPU, GPU, MPU, SOC, etc. As shown, N thermal sensors 304, individually numbered thermal sensor 1, thermal sensor 2, . . . , thermal sensor N, are distributed in the system 300, in which N is any positive integer greater than 0. Each thermal sensor 304 is located at a corresponding "site" for determining the temperature at that location within the system 300, and develops a corresponding sense signal S1 ... SN provided to the temperature measurement select and control block 302. The temperature measurement select and control block 302 accesses and activates a selected one or more of the thermal sensors 304 for determining a temperature at the corresponding one or more sites.

The electronic system 300 may be implemented on an integrated circuit ("IC") or chip such as, for example, within a system-on-chip ("SOC"), or as part of an embedded processing system or the like. In this case, the multiple thermal sensors 304 may be provided to determine the temperature at corresponding locations on the chip. Although multiple thermal sensors 304 are shown, N may also be 1 for a configuration with only one thermal sensor 304. Alternatively, the electronic system 300 may be implemented in a discrete manner in which the temperature measurement select and control block 302 and the one or more thermal sensors 304 may each be implemented on a separate IC or otherwise may include any combination of one or more ICs or semiconductor chips or the like. The electronic system 300 may be configured for any type of application, such as communication systems, computer systems, sensing devices, etc., and for any one or more of consumer, industrial, commercial, computing, and/or automotive fields.

Figure 4:
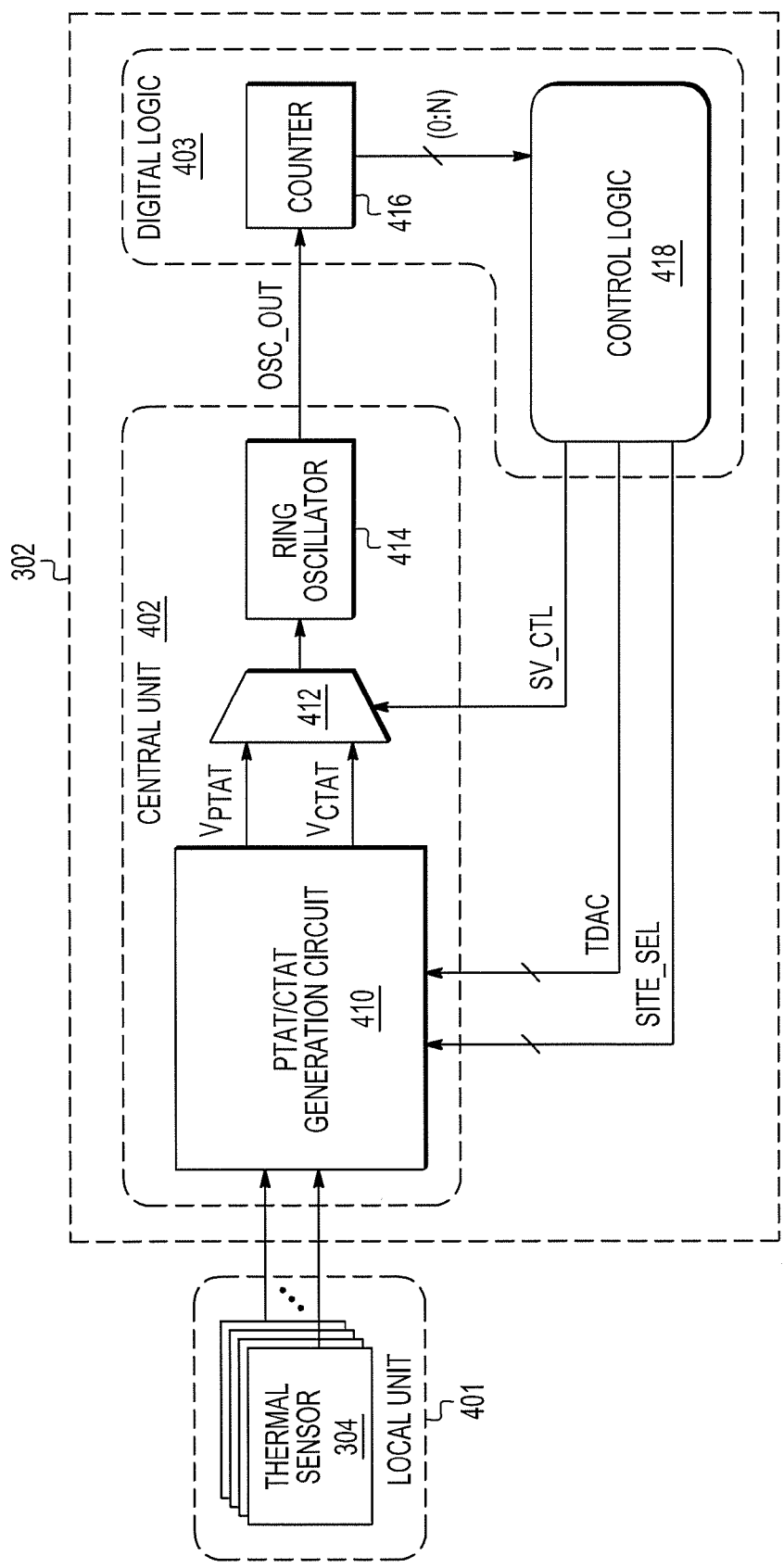
FIG. 4 illustrates temperature sensor circuitry configured in accordance with embodiments of the present invention.

FIG. 4 illustrates a block diagram of further details regarding the temperature measurement select and control block 302. For purposes of describing embodiments of the present invention, FIG. 4 shows the thermal sensors 304 as part of a designated local unit 401, the reason of which will be more apparent in the discussion of FIG. 5 hereinafter. The temperature measurements select and control block 302 is further divided between a central unit 402 and digital logic block 403. The central unit 402 includes a PTAT/CTAT generation circuit 410, which produces voltage signals as a function of a temperature sensed by one or more of the remote thermal sensors 304. A multiplexor 412 selectively outputs either the PTAT or CTAT voltage signals ($V_{PTAT}$ and $V_{CTAT}$, respectively) to a ring oscillator 414 within the central unit 402.

As well be further described with respect to FIG. 5, the PTAT/CTAT generation circuit 410 and multiplexor 412 receive control signals SITE_SEL, TDAC, and SV_CTL from the control logic 418 within the digital logic block 403. This digital logic block 403 further includes a counter 416, which receives an output OSC_OUT from the ring oscillator 414. Essentially, the ring oscillator 414 converts the output voltage signal from the multiplexor 412 to a frequency-based signal. The counter 416 then converts this frequency-based signal to a digital signal of a predetermined N number of bits, where N is an integer greater than 0, which is delivered to the control logic 418.

FIG. 5 illustrates further details regarding the circuitry utilized to implement the local unit 401 and the central unit 402, in accordance with embodiments of the present invention. Depicted within the local unit 401 in FIG. 5 is a single thermal sensor site 304.

A thermal sensor site 304 may be selected from the N thermal sensors 304 shown in FIG. 3 by a SITE_SEL signal received by multiplexors 501, 502, and 503, which are coupled to each of the N thermal sensors 304. The control logic 418 in FIG. 4 selects a thermal sensor site 304 by sending the SITE_SEL signal to the multiplexors 501, 502, and 503.

In embodiments of the present invention, a differential bipolar junction transistor ("BJT") diode array is utilized to sense the temperature at a selected site instead of utilizing a single BJT diode array. As a result, a $\Delta V_{be}$ value is generated instead of merely relying upon a single voltage value of $V_{be}$.

Figure 6:
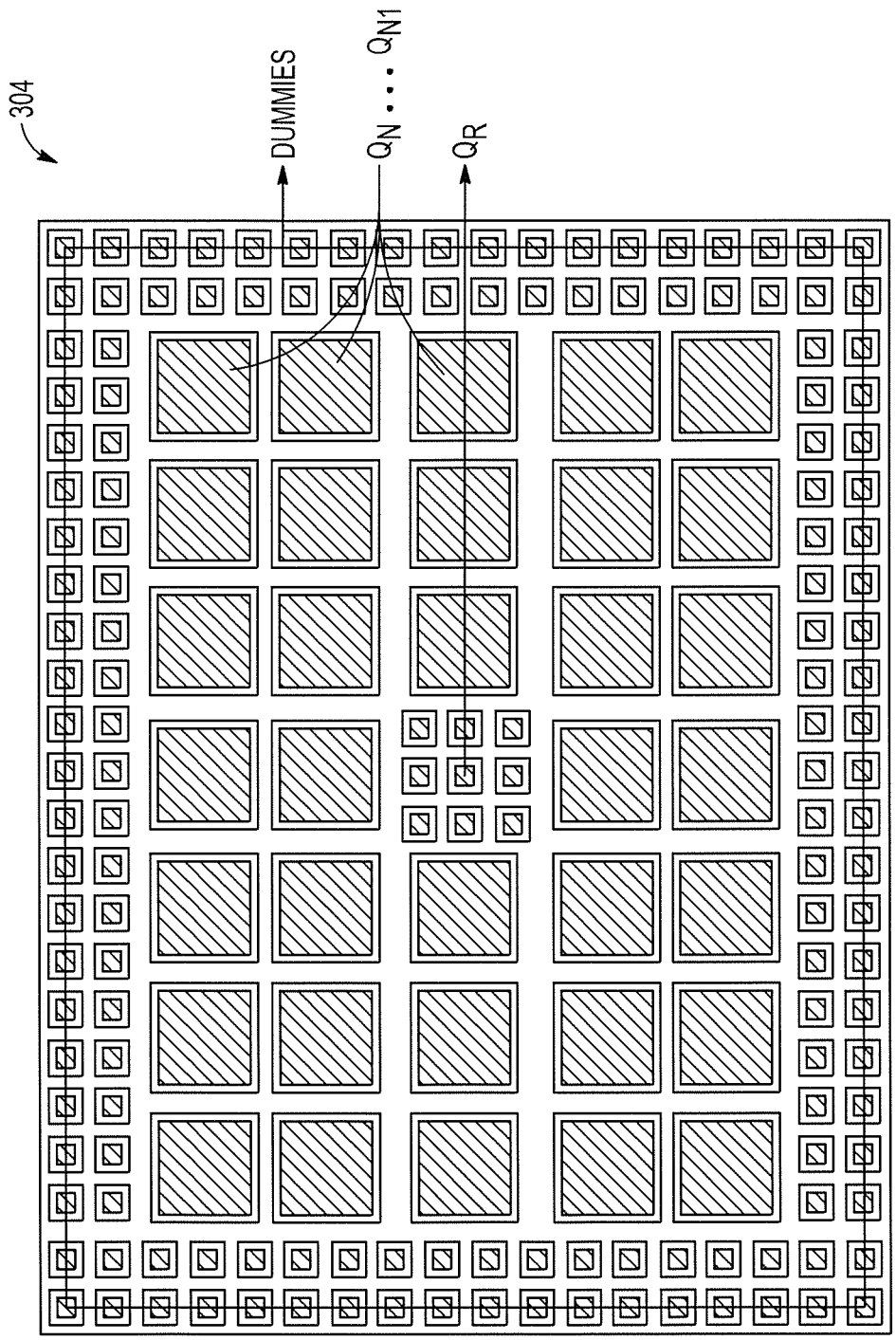
FIG. 6 illustrates an exemplary circuit layout of a remote temperature sensor.

FIG. 6 illustrates an exemplary device layout for a thermal sensor site 304 implemented on a die or chip. The diode $Q_R$ has a significantly smaller diode area than the diodes $Q_N$ ... $Q_{N1}$ surrounding the diode $Q_R$. The base emitter voltage $V_{be}$ is a function of current density, which is a function of the device's emitter injection area. Embodiments of the present invention utilize the ratio of the injection areas of the emitters between the diodes $Q_R$ and $Q_N$ ... $Q_{N1}$. The diode $Q_R$ may be comprised of one or more BJT diodes, and $Q_N$ ... $Q_{N1}$ may be comprised of two or more BJT diodes, but regardless, the total injection area of the parallel connected diodes $Q_N$ ... $Q_{N1}$ is greater than the injection area for diode(s) $Q_R$. Note that the device layout illustrated in FIG. 6 is merely exemplary. In this illustrated example, there are 9 diodes $Q_R$ shown surrounded by 34 diodes $Q_1$ ... $Q_{34}$. Any number of the diodes $Q_R$ may be activated for utilization in thermal sensor site 304, with the inactive diodes acting as "dummies" The same may be true with respect to the diodes $Q_1$ ... $Q_{34}$, which are shown surrounded by one or more "rings" of dummy devices. Dummy devices may operate as a means for signal buffering/separation from adjoining devices.

A device layout as shown in the exemplary layout in FIG. 6 provides the previously noted ratio of emitter injection areas for a sensor site 304. It is this ratio of emitter injection areas that enables the generation of the $\Delta V_{be}$ value. As temperature increases at the sensor site 304, the base to emitter voltage of the BJT diodes decreases. However, the base-emitter voltage for the $V_{be1}$ from the parallel arrangement of diodes $Q_N$ ... $Q_{N1}$ is generally less than the base-emitter voltage $V_{be0}$ from diode $Q_R$ for a given temperature, because the emitter current density is lower. Moreover, this difference linearly increases with increasing temperature; thus, the $\Delta V_{be}$ value increases with temperature. Alternatively, the thermal sensors 304 may be configured as a PN junction diode, a diode-coupled PNP, an NPN transistor, or the like.

Returning to FIG. 5, a current mirror is created by the combination of p-channel field effect transistors ("PFET") transistors M1, M2, and operational amplifier ("op-amp") 504 in order to have currents $I_0$ and $I_1$ mirror each other. Current $I_0$ is created by the base-emitter voltage $V_{be0}$ from diode $Q_R$, while current $I_1$ is created by the base-emitter voltage $V_{be1}$ from the parallel arrangement of diodes $Q_N$ ... $Q_{N1}$.

As shown in FIG. 5, once a thermal sensor 304 at a site is selected, voltages $V_{be0}$ and $V_{be1}$ are sensed by the circuitry 402. The op-amp 504 functions to maintain as equal its input voltages $V_a$ and $V_b$. Since $V_a = V_{be0}$, then $V_b = V_{be0}$. $\Delta V_{be}$ is the voltage drop across the resistor $R_{Vbe}$, which is equal to $V_b - V_c$. $V_c$ is equal to $V_{be1}$. Therefore, $\Delta V_{be}$ is equal to $V_{be0} - V_{be1}$. Since the currents $I_1$ and $I_{PTAT}$ are forced to be the same, the PTAT voltage $V_{PTAT}$ produced through resistor R1 is proportional to $\Delta V_{be}$. This PTAT voltage $V_{PTAT}$ is one of the inputs into multiplexor 412.

The outputs of multiplexors 502 and 503 are providing the same voltage value $V_{be1}$, which is therefore input as voltage $V_c$ into the negative input of op-amp 505; the positive input is voltage $V_d$. The current mirror configured from op-amp 505, PFETs $M_4$ and $M_5$, and current $I_2$ running through resistors R3 and R4 produces ICAT current $I_{ICAT}$, which produces CTAT voltage $V_{CTAT}$ through resistor R2. Thus, CTAT voltage $V_{CTAT}$ is proportional to voltage $V_{be1}$.

As a result of the foregoing, the PTAT voltage $V_{PTAT}$ is proportional to increases in temperature at the selected thermal sensor 304, while the CTAT voltage $V_{CTAT}$ is inversely proportional to temperature increases at the selected thermal sensor 304.

The PTAT/CTAT generation circuit 410 further includes a selectable DAC bit array 512, which receives the TDAC signal from the control logic 418. The DAC bit array 512 functions to increment the $V_{CTAT}$ voltage value by a scalar multiple. The DAC bit array 512 may comprise a plurality of parallel connected legs of PFETs, wherein each leg comprises a PFET M7 in series with a PFET M6. The number of such parallel legs of the DAC bit array 512 may be a function of the number of DAC bits to be implemented in order to achieve a desired plurality of scalar factors for the scalar multiple of the $V_{CTAT}$ voltage value. For example, to implement N bits for the DAC bits, N parallel legs of the M6 and M7 PFETs might be implemented. The scalar factor added to, or multiplying, the $V_{CTAT}$ voltage signal is dependent upon the predetermined number and sizes of the PFETs within this array.

Resistors R1-R4 may be designed to adjust the $V_{PTAT}$ and/or $V_{CTAT}$ voltages so that they intersect within a voltage range (for the desired temperature range) in which the ring oscillator is able to operate to linearly convert the input voltage to a frequency. The PTAT minimum and maximum voltages may be used to define the ring oscillator operating voltage range.

The multiplexor 412 selects either of the voltage values $V_{PTAT}$ or $V_{CTAT}$ in response to the SV_CTL selection signal received from the control logic 418. The output of the multiplexor 412 is delivered to the ring oscillator 414, which outputs a proportionate frequency value OSC_OUT in response thereto.

Returning to FIG. 4, the frequency value OSC_OUT is received by the counter 416, which outputs an N-bit digital value proportionally representative of the inputted frequency value OSC_OUT. This counter output is delivered to the control logic 418.

Figure 8:
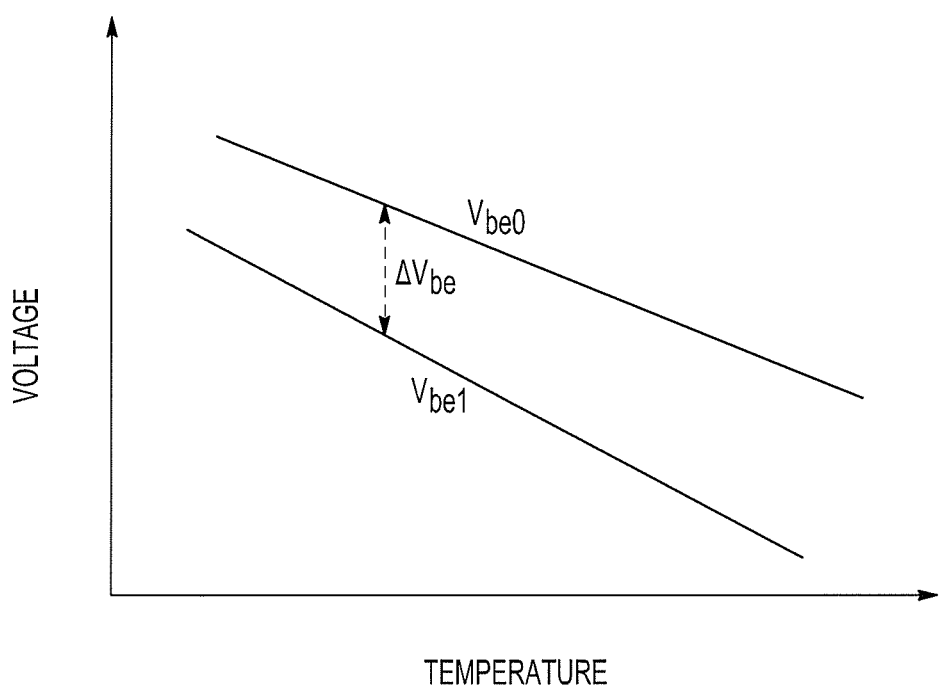
FIG. 8 illustrates an exemplary plot showing the linear relationship of $\Delta V_{be}$ to temperature.

Essentially, embodiments of the present invention perform a DAC value to temperature conversion to determine the temperature at the selected thermal sensor site 304. The temperature measurement select and control block 302 determines which DAC bit array value translates to the measured temperature at the thermal sensor site 304. Referring again to FIG. 2, for each given DAC bit value, there is only one unique temperature that occurs at the intersection of the PTAT and scaled CTAT voltage values. Adjusting either the PTAT or CTAT voltages results in a different temperature value. The scalar factor is then used for adjusting this intersection for each unique temperature value. The double-dashed arrow 200 illustrates how the different scaled CTAT voltage lines CTAT0 . . . CTATN "slide" along the PTAT voltage line. Recall that $\Delta V_{be}$ is equal to the difference between $V_{be0}$ and $V_{be1}$. This is further illustrated in FIG. 8, which shows exemplary $V_{be0}$ and $V_{be1}$ plots as a function of temperature. As can be readily appreciated, this difference $\Delta V_{be}$ (i.e., $V_{PTAT}$) increases linearly with increasing temperature.

By multiplying the CTAT voltage value by a scalar multiple, there is achieved a temperature at which the PTAT voltage $V_{PTAT}$ and the CTAT voltage $V_{CTAT}$ are the same. This is accomplished through utilization of the DAC bit array. Thus, for each DAC bit value, there is only one unique temperature intersection of PTAT and CTAT.

Embodiments of the present invention for performing the foregoing will now be described with respect to FIG. 7, with further reference to FIGS. 4 and 5. The process 700 may be implemented in the control logic 418. The control logic 418 may initiate temperature monitoring 701 in response to an externally generated signal, such as from a user or another process running on the IC chip on which the invention is implemented, or in response to an automatically and/or intermittently generated internal signal to monitor the temperature at one or more of the thermal sensor sites 304.

In step 702, the control logic determines which of the sites 304 it selects to monitor next, and sends the SITE_SEL signal to the multiplexors 501, 502, 503 in order that the diode base-emitter voltages of BJT diodes $Q_R$ and $Q_N$ . . . $Q_{N1}$ at the selected thermal site 304 are sensed. A result is the generation of the $V_{PTAT}$ and $V_{CTAT}$ voltage signals by the PTAT/CTAT generation circuit 410, which are input into the multiplexor 412.

The control logic operates the system in two modes to measure the on-die temperature. In a reference mode, the ring oscillator converts the $V_{PTAT}$ voltage value to a time value (i.e., a frequency signal), which in turn is converted into a digital value by the counter. In a measurement mode, the ring oscillator converts the $V_{CTAT}$ voltage value to a time value (i.e., a frequency signal), which in turn is converted into a digital value by the counter.

Thus, the temperature output from the system in these embodiments is a result of the $V_{CTAT}$ voltage value adjusted by the DAC bit value such that the digital value resulting from the reference mode is approximately equal to that resulting from the measurement mode.

In step 703, the control logic initiates a reference mode of the process 700 by sending the SV_CTL signal to the multiplexor 412 to select the $V_{PTAT}$ voltage signal for output to the ring oscillator 414. In this reference mode, the ring oscillator 414 measures the PTAT voltage $V_{PTAT}$. Thus, the reference mode voltage increases with temperature at the sensed site 304, resulting in the output frequency of the ring oscillator 414 increasing with that sensed temperature. The ring oscillator 414 may comprise a well-known ring oscillator circuit configuration (e.g., a loop of series-connected inverters) in which the output frequency signal OSC_OUT is directly proportional to the input voltage signal.

This output frequency signal OSC_OUT is measured in step 704 by the digital counter 416, which outputs an N-bit (N is an integer greater than zero) frequency count signal proportional to the frequency signal OSC_OUT. The control logic 418 then stores this N-bit frequency count signal in step 705.

Next, in step 706, the control logic 418 initiates a measurement mode, by selecting output of the $V_{CTAT}$ voltage signal from the multiplexor 412 with the SV_CTL signal. As a result, the ring oscillator measures the CTAT voltage $V_{CTAT}$, which is complementary to absolute temperature, i.e., inversely proportional to temperature at the selected thermal site 304.

In step 707, the control logic 418 selects an initial TDAC bit value, which is received by the DAC bit array 512. The control logic 418 is thus beginning a process of applying a scalar factor to the $V_{CTAT}$ voltage signal (by adjusting the $I_{CTAT}$ current through resistor R2) in an effort to determine at which scalar factor the $V_{CTAT}$ voltage value equals the previously measured $V_{PTAT}$ voltage value, which occurs at a unique temperature value for each scalar factor. The initial scalar factor, i.e., TDAC bit value, selected by the control logic 418 may be anywhere within a range of the available scalar factors, including the lowest or highest scalar factor, or anywhere in between.

In step 708, the frequency signal OSC_OUT (which is proportional to the $V_{CTAT}$ voltage signal multiplied by the initial scalar factor selected with the TDAC bit value) output from the ring oscillator 414 is measured. The counter 416 will then output a digital frequency count value in response to the received frequency signal OSC_OUT.

In step 709, this measured frequency count value is compared to the previously stored frequency count value determined during the reference mode. This is the control logic 418's initial determination if the measured $V_{CTAT}$ scaled voltage is substantially the same as the measured $V_{PTAT}$ voltage signal. If the voltage values are determined as substantially equal in step 710, then the control logic 418 will output in step 712 the temperature corresponding to the intersection of the $V_{PTAT}$ and $V_{CTAT}$ voltage values (e.g., see FIG. 2), in accordance with embodiments discussed hereinafter.

If in step 710, it is determined that the frequency counts of the $V_{PTAT}$ and $V_{CTAT}$ voltage signals are not substantially equal (e.g., at least within a predetermined threshold level), then in step 711, the TDAC bit value is incremented according to the next scalar factor to apply to the $V_{CTAT}$ voltage value. The control logic 418 may be programmed whether the TDAC bit value (i.e., the scalar factor) is increased or decreased for this incremental change.

As illustrated in FIG. 5, the TDAC bit value sent from the control logic 418 may be coupled to one or more PFETs in the DAC bit array 512 for implementing the scalar factor of the $V_{CTAT}$ voltage signal. For example, the scalar factor may be incrementally decreased by increasing the TDAC bit value to activate less PFETs than previously; a higher scalar factor may be incrementally increased with a lower TDAC bit value turning on more of the PFETs.

After the TDAC bit value has been incremented for the next scalar factor to be considered, the $V_{CTAT}$ voltage value multiplied by the new scalar factor is output from the multiplexor 412 (in response to the SV_CTL signal) to produce the corresponding frequency signal OSC_OUT from the ring oscillator 414. Steps 708-709 produce a frequency count value corresponding to the $V_{CTAT}$ voltage signal incremented by the new scalar factor. Then, step 710 determines if this frequency count value is substantially equal to the frequency count value corresponding to the $V_{PTAT}$ voltage signal previously measured during the reference mode.

Steps 708-711 will be repeated until there is a match of the frequency counts, meaning that the intersection of the $V_{PTAT}$ and scaled $V_{CTAT}$ voltage signal has been determined Step 712 then uses the scalar factor corresponding to this successful match to determine and output the corresponding temperature for the measured thermal site 304.

This corresponding temperature may be determined in various manners. For example, when the IC chip is being manufactured, each of the thermal sensor sites can be intentionally heated to multiple specifically known temperatures; and, for each known temperature, the control logic 418 stores in a lookup table the TDAC bit value corresponding to the scalar factor applied to the $V_{CTAT}$ voltage value that results in the frequency count value corresponding to the scaled $V_{CTAT}$ voltage being substantially equal to the frequency count corresponding to the $V_{PTAT}$ voltage. The resultant lookup table stored in the control logic 418 will thus include a unique scalar TDAC bit value for each unique corresponding temperature. The process 700 may be utilized to generate such a table.

Another manner in which to determine the temperature to output in step 712 is to determine the TDAC bit values that apply the appropriate scalar factors relative to the temperatures, and produce a corresponding equation that may be implemented in software or hardware in the control logic 418, which will then be utilized to output the temperature as a function of the TDAC bit value resulting in a match of the $V_{PTAT}$ voltage signal and the scaled $V_{CTAT}$ voltage signal.

A modification to the process 700 may be implemented for a situation when steps 708-711 do not result in a match of frequency counts. In such a modification, steps may be incorporated to simply output that the temperature is greater than (or less than) the maximum (or minimum) temperature determined from the last TDAC bit value incremented.

Figure 9:
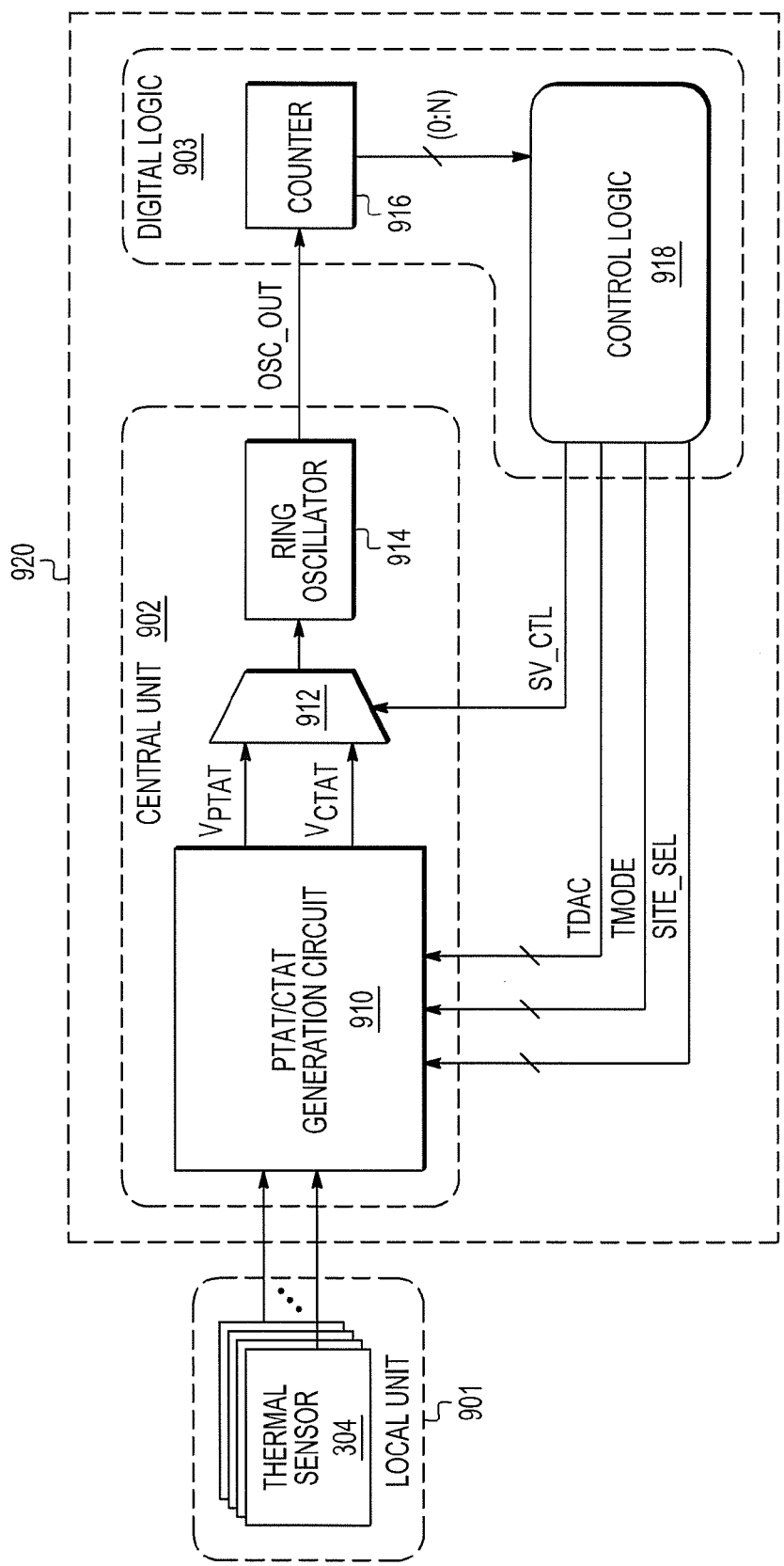
FIG. 9 illustrates temperature sensor circuitry configured in accordance with alternative embodiments of the present invention.

FIG. 9 illustrates a block diagram of further details regarding a temperature measurement select and control block 920 in accordance with alternative embodiments of the present invention. Operation of temperature measurement select and control block 920 is similar to that of block 302, with differences noted in the following description. FIG. 9 shows the thermal sensors 304 as part of a designated local unit 901 in accordance with such alternative embodiments of the present invention. The temperature measurements select and control block 920 is further divided between a central unit 902 and digital logic block 903. The central unit 902 includes a PTAT/CTAT generation circuit 910, which produces voltage signals as a function of a temperature sensed by one or more of the remote thermal sensors 304. A multiplexor 912 selectively outputs either the PTAT or CTAT voltage signals ($V_{PTAT}$ and $V_{CTAT}$, respectively) to a ring oscillator 914 within the central unit 902.

Figure 10:
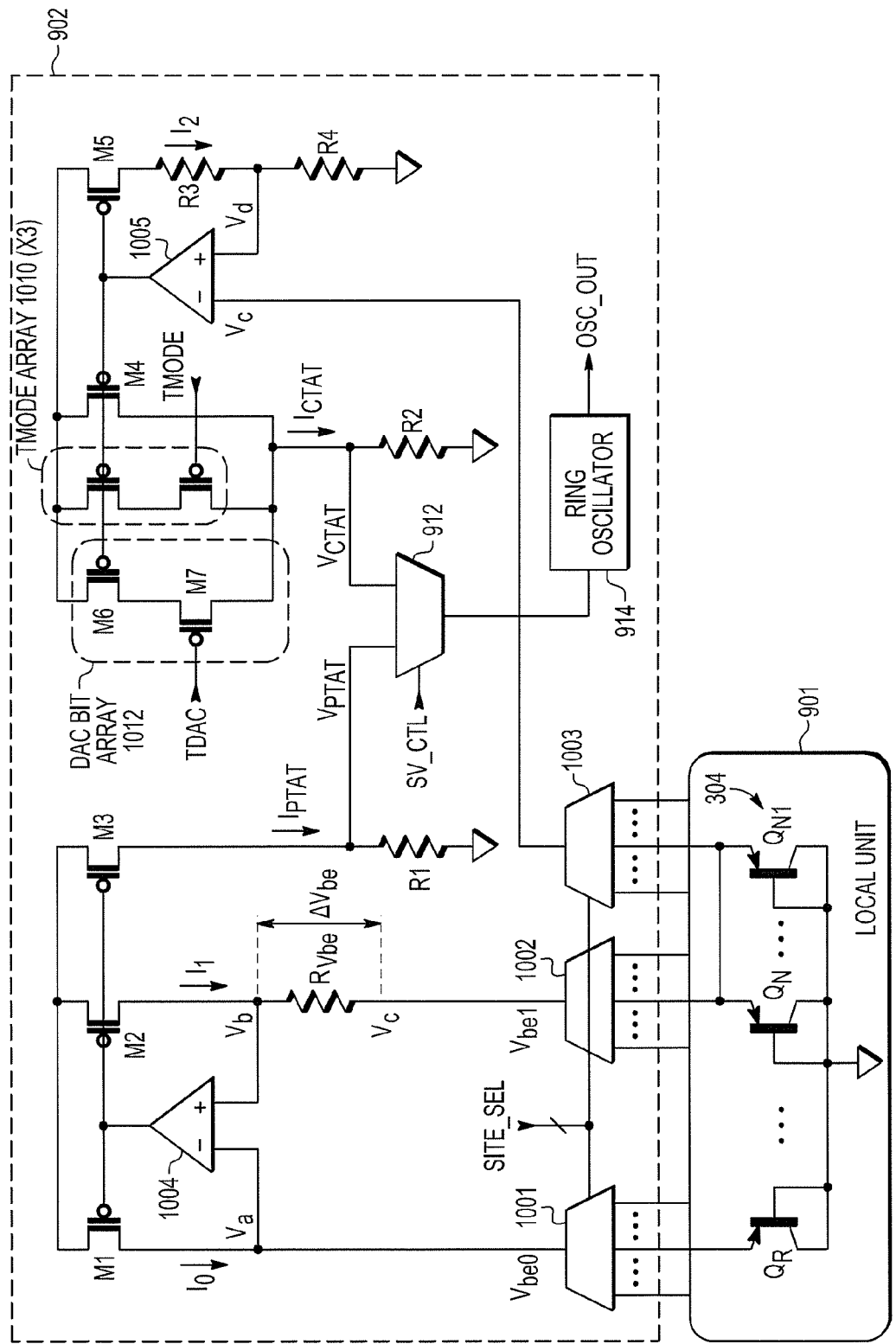
FIG. 10 illustrates electronic circuitry for conversion of a sensed temperature to a voltage value in accordance with alternative embodiments of the present invention.

As well be further described with respect to FIG. 10, the PTAT/CTAT generation circuit 910 and multiplexor 912 receive control signals SITE_SEL, TMODE, TDAC, and SV_CTL from the control logic 918 within the digital logic block 903. This digital logic block 903 further includes a counter 916, which receives an output OSC_OUT from the ring oscillator 914. Essentially, the ring oscillator 914 converts the output voltage signal from the multiplexor 912 to a frequency-based signal. The counter 916 then converts this frequency-based signal to a digital signal of a predetermined N number of bits, where N is an integer greater than 0, which is delivered to the control logic 918.

FIG. 10 illustrates further details regarding the circuitry utilized to implement the local unit 901 and the central unit 902, in accordance with embodiments of the present invention. Depicted within the local unit 901 in FIG. 10 is a single thermal sensor site 304.

A thermal sensor site 304 may be selected from the N thermal sensors 304 shown in FIG. 3 by a SITE_SEL signal received by multiplexors 1001, 1002, and 1003, which are coupled to each of the N thermal sensors 304. The control logic 918 in FIG. 9 selects a thermal sensor site 304 by sending the SITE_SEL signal to the multiplexors 1001, 1002, and 1003.

As shown in FIG. 10, a current mirror is created by the combination of PFET transistors M1, M2, and operational amplifier ("op-amp") 1004 in order to have currents $I_0$ and $I_1$ mirror each other. Current $I_0$ is created by the base-emitter voltage $V_{be0}$ from diode $Q_R$, while current $I_1$ is created by the base-emitter voltage $V_{be1}$ from the parallel arrangement of diodes $Q_N \ldots Q_{N1}$. Once a thermal sensor 304 at a site is selected, voltages $V_{be0}$ and $V_{be1}$ are sensed by the circuitry 902. The op-amp 1004 functions to maintain as equal its input voltages $V_a$ and $V_b$. Since $V_a=V_{be0}$, then $V_b=V_{be0}$. $\Delta V_{be}$ is the voltage drop across the resistor $R_{Vbe}$, which is equal to $V_b-V_c$. $V_c$ is equal to $V_{be1}$. Therefore, $\Delta V_{be}$ is equal to $V_{be0}-V_{be1}$. Since the currents $I_1$ and $I_{PTAT}$ are forced to be the same, the PTAT voltage $V_{PTAT}$ produced through resistor R1 is proportional to $\Delta V_{be}$. This PTAT voltage $V_{PTAT}$ is one of the inputs into multiplexor 912.

The outputs of multiplexors 1002 and 1003 are providing the same voltage value $V_{be1}$, which is therefore input as voltage $V_c$ into the negative input of op-amp 1005; the positive input is voltage $V_d$. The current mirror configured from op-amp 1005, PFETs $M_4$ and $M_5$, and current $I_2$ running through resistors R3 and R4 produces ICAT current $I_{ICAT}$, which produces CTAT voltage $V_{CTAT}$ through resistor R2. Thus, CTAT voltage $V_{CTAT}$ is proportional to voltage $V_{be1}$.

As a result of the foregoing, the PTAT voltage $V_{PTAT}$ is proportional to increases in temperature at the selected thermal sensor 304, while the CTAT voltage $V_{CTAT}$ is inversely proportional to temperature increases at the selected thermal sensor 304.

The PTAT/CTAT generation circuit 910 further includes a selectable DAC bit array 1012, which receives the TDAC signal from the control logic 918. The DAC bit array 1012 functions to increment the $V_{CTAT}$ voltage value by a scalar multiple. The DAC bit array 1012 may comprise a plurality of parallel connected legs of PFETs, wherein each leg comprises a PFET M7 in series with a PFET M6. The number of such parallel legs of the DAC bit array 1012 may be a function of the number of DAC bits to be implemented in order to achieve a desired plurality of scalar factors for the scalar multiple of the $V_{CTAT}$ voltage value. For example, to implement N bits for the DAC bits, N parallel legs of the M6 and M7 PFETs might be implemented. The scalar factor added to, or multiplying, the $V_{CTAT}$ voltage signal is dependent upon the predetermined number and sizes of the PFETs within this array.

The alternative embodiments of the present invention described with respect to FIGS. 9-12 implement a TMODE range operation to aid in a determination of the temperature for which there is an intersection of the PTAT and CTAT voltages, while maintaining a stable operating voltage range for the ring oscillator 914. The TMODE range signal functions as a DAC bit value expander. Thus, the scalar factor applied to the $V_{CTAT}$ voltage signal is controlled by the DAC bit array code and the TMODE range signal (which may also comprise an N-bit code where N is greater than 1). The scalar factor added to, or multiplying, the $V_{CTAT}$ voltage signal is dependent upon the predetermined number and sizes of the PFETs within each of these arrays.

Though not limited to the specific embodiments illustrated in FIG. 10, an exemplary TMODE array 1010 may include one or more arrays of PFETs (FIG. 10 is described with respect to three (see "X3" notation in FIG. 10)), with each array including a PFET receiving the TMODE signal from the control logic 918 in series with another PFET. This TMODE signal operates to select zero or more of the TMODE arrays 1010 for activation. As previously noted, the TMODE array(s) operate to expand the DAC bit value (and corresponding scalar factor) applied to the $V_{CTAT}$ voltage signal. For example, for an exemplary arrangement of three parallel TMODE arrays, if none are activated by the TMODE signal, then no additional scalar factor is added to the selected DAC bit value, and so on. A reason such a TMODE factor may be implemented is to further maintain the ring oscillator 914 within a stable operating voltage range.

The multiplexor 912 selects either of the voltage values $V_{PTAT}$ or $V_{CTAT}$ in response to the SV_CTL selection signal received from the control logic 918. The output of the multiplexor 912 is delivered to the ring oscillator 914, which outputs a proportionate frequency value OSC_OUT in response thereto.

Returning to FIG. 9, the frequency value OSC_OUT is received by the counter 916, which outputs an N-bit digital value proportionally representative of the inputted frequency value OSC_OUT. This counter output is delivered to the control logic 918.

By multiplying the CTAT voltage value by a scalar multiple, there is achieved a temperature at which the PTAT voltage $V_{PTAT}$ and the CTAT voltage $V_{CTAT}$ are the same. This is accomplished through utilization of the TMODE array 1010 and DAC bit array 1012. Thus, for each TMODE range and DAC bit value, there is only one unique temperature intersection of PTAT and CTAT.

Embodiments of the present invention for performing the foregoing will now be described with respect to FIG. 11, with further reference to FIGS. 9 and 10. The process 1100 may be implemented in the control logic 918. The control logic 918 may initiate temperature monitoring 1101 in response to an externally generated signal, such as from a user or another process running on the IC chip on which the invention is implemented, or in response to an automatically and/or intermittently generated internal signal to monitor the temperature at one or more of the thermal sensor sites 304.

In step 1102, the control logic determines which of the sites 304 it selects to monitor next, and sends the SITE_SEL signal to the multiplexors 1001, 1002, 1003 in order that the diode base-emitter voltages of BJT diodes $Q_R$ and $Q_N \ldots Q_{N1}$ at the selected thermal site 304 are sensed. A result is the generation of the $V_{PTAT}$ and $V_{CTAT}$ voltage signals by the PTAT/CTAT generation circuit 910, which are input into the multiplexor 912.

The control logic 918 operates the system in two modes to measure the on-die temperature. In a reference mode, the ring oscillator 914 converts the $V_{PTAT}$ voltage value to a time value (a frequency signal), which in turn is converted into a digital value by the counter 916. In a measurement mode, the ring oscillator 914 converts the $V_{CTAT}$ voltage value to a time value (a frequency signal), which in turn is converted into a digital value by the counter 916.

Thus, the temperature output from the system in these embodiments is a result of the $V_{CTAT}$ voltage value adjusted by the TMODE and DAC bit values such that the digital value resulting from the reference mode is approximately equal to that resulting from the measurement mode.

In step 1103, the control logic initiates a reference mode of the process 1100 by sending the SV_CTL signal to the multiplexor 912 to select the $V_{PTAT}$ voltage signal for output to the ring oscillator 914. In this reference mode, the ring oscillator 914 measures the PTAT voltage $V_{PTAT}$. Thus, the reference mode voltage increases with temperature at the sensed site 304, resulting in the output frequency of the ring oscillator 914 increasing with that sensed temperature. The ring oscillator 914 may comprise a well-known ring oscillator circuit configuration (e.g., a loop of series-connected inverters) in which the output frequency signal OSC_OUT is directly proportional to the input voltage signal.

This output frequency signal OSC_OUT is measured in step 1104 by the digital counter 916, which outputs an N-bit (N is an integer greater than zero) frequency count signal proportional to the frequency signal OSC_OUT. The control logic 918 then stores this N-bit frequency count signal in step 1105.

Next, in step 1106, the control logic 918 initiates a measurement mode, by selecting output of the $V_{CTAT}$ voltage signal from the multiplexor 912 with the SV_CTL signal. As a result, the ring oscillator 914 measures the CTAT voltage $V_{CTAT}$, which is complementary to absolute temperature, i.e., inversely proportional to temperature at the selected thermal site 304.

Figure 12:
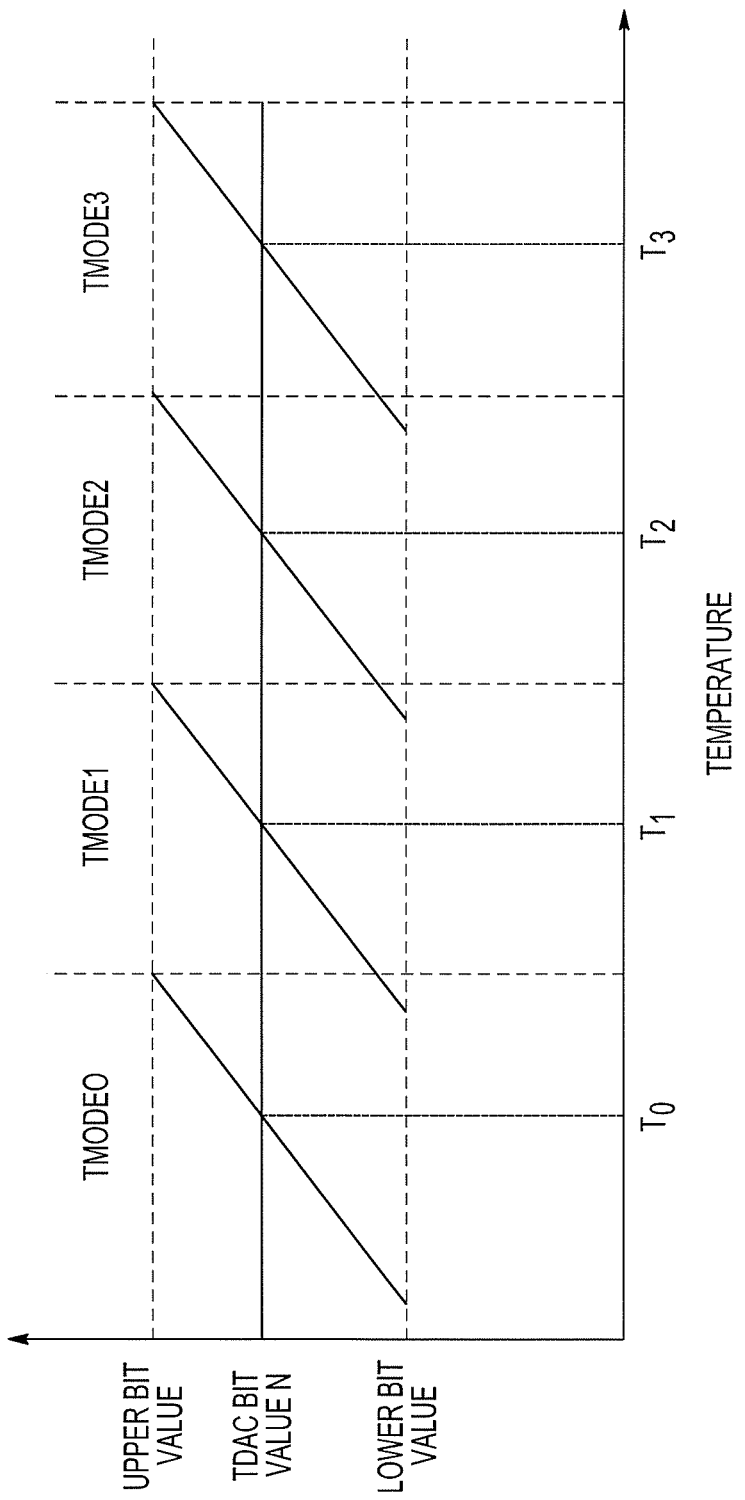
FIG. 12 illustrates a representation of TMODE ranges implemented in accordance with alternative embodiments of the present invention.

In step 1107, the control logic 918 selects an initial TMODE range value (for example, any one of N TMODE range values, where N is an integer greater than 1; e.g., see exemplary TMODE ranges TMODE0, TMODE1, TMODE2, TMODE3 in FIG. 12), which is received by the TMODE array 1010, and an initial TDAC bit value, which is received by the DAC bit array 1012. The control logic 918 is thus beginning a process of applying a scalar factor to the $V_{CTAT}$ voltage signal (by adjusting the $I_{CTAT}$ current through resistor R2) in an effort to determine at which scalar factor the $V_{CTAT}$ voltage value equals the previously measured $V_{PTAT}$ voltage value, which occurs at a unique temperature value for each scalar factor. The initial TDAC scalar factor, i.e., TDAC bit value, selected by the control logic 918 may be anywhere within a range of the available scalar factors, including the lowest or highest scalar factor, or anywhere in between.

In step 1108, the frequency signal OSC_OUT (which is proportional to the $V_{CTAT}$ voltage signal multiplied by the initial scalar factor selected with the TMODE range and TDAC bit values) output from the ring oscillator 914 is measured. The counter 916 will then output a digital frequency count value in response to the received frequency signal OSC_OUT.

In step 1109, this measured frequency count value is compared to the previously stored frequency count value determined during the reference mode. This is the control logic 918's initial determination if the measured $V_{CTAT}$ scaled voltage is substantially the same as the measured $V_{PTAT}$ voltage signal. If the voltage values are determined as substantially equal in step 1110, then the control logic 918 will output in step 1115 the temperature corresponding to the intersection of the $V_{PTAT}$ and $V_{CTAT}$ voltage values (e.g., see FIG. 2), in accordance with embodiments previously discussed herein.

If in step 1110, it is determined that the frequency counts of the $V_{PTAT}$ and $V_{CTAT}$ voltage signals are not substantially equal (e.g., at least within a predetermined threshold level), then in step 1111, the control logic 918 determines if all of the TDAC bit values have been attempted for that TMODE range (all increments attempted). If not, then the process proceeds to step 1112 where the TDAC bit value is incremented according to the next scalar factor to apply to the $V_{CTAT}$ voltage value. The control logic 918 may be programmed whether the TDAC bit value (i.e., the scalar factor) is increased or decreased for this incremental change. If in step 1111 it is determined that all the TDAC bit values have been attempted, then in step 1113, the TMODE range value is incremented to the next TMODE range, and in step 1114, the TDAC bit value is reset for this new TMODE range. An example of this process is further illustrated in FIG. 12, which shows incrementing of the TDAC bit values within each of the TMODE ranges 0 . . . 3.

As illustrated in FIG. 10, the TDAC bit value sent from the control logic 918 may be coupled to one or more PFETs in the DAC bit array 1012 for implementing the scalar factor of the $V_{CTAT}$ voltage signal. For example, the scalar factor may be incrementally decreased by increasing the TDAC bit value to activate less PFETs than previously; a higher scalar factor may be incrementally increased with a lower TDAC bit value turning on more of the PFETs. The initial TMODE range (e.g., see exemplary TMODE ranges TMODE0, TMODE1, TMODE2, TMODE3 in FIG. 12) and the incrementing of the TMODE range may be predetermined similarly as is done for the TDAC bit value.

After the TDAC bit value has been incremented for the next scalar factor to be considered, the $V_{CTAT}$ voltage value multiplied by the new scalar factor is output from the multiplexor 912 (in response to the SV_CTL signal) to produce the corresponding frequency signal OSC_OUT from the ring oscillator 914. Steps 1108-1109 produce a frequency count value corresponding to the $V_{CTAT}$ voltage signal incremented by the new scalar factor. Then, step 1110 determines if this frequency count value is substantially equal to the frequency count value corresponding to the $V_{PTAT}$ voltage signal previously measured during the reference mode.

Steps 1108-1114 will be repeated until there is a match of the frequency counts, meaning that the intersection of the $V_{PTAT}$ and scaled $V_{CTAT}$ voltage signals has been determined Step 1115 then uses the scalar factor corresponding to this successful match (i.e., the TMODE range value and the TDAC bit value) to determine and output the corresponding temperature for the measured thermal site 304. This corresponding temperature may be determined in various manners as previously described.

A modification to the process 1100 may be implemented for a situation when steps 1108-1114 do not result in a match of frequency counts. In such a modification, steps may be incorporated to simply output that the temperature is greater than (or less than) the maximum (or minimum) temperature determined from the last TMODE range and TDAC bit values incremented.

Aspects of the present invention disclose a system for determining a temperature of a location in an integrated circuit, comprising first circuitry, in proximity to the location in the integrated circuit, configured to adjust first and second output voltages as a function of its operating temperature; second circuitry configured to convert the first and second output voltages to a first voltage signal that is proportional to the operating temperature; third circuitry configured to convert the second output voltage to a second voltage signal that is inversely proportional to the operating temperature; fourth circuitry configured to apply one of a plurality of selectable scalar factors to the second voltage signal to produce a scaled voltage signal; and fifth circuitry configured to determine the temperature of the location in the integrated circuit when the scaled voltage signal is substantially equal to the first voltage signal. The second circuitry may further comprise a first current mirror circuit with a first input coupled to receive the first output voltage from the first circuitry and a second input coupled to receive the second output voltage from the first circuitry, wherein the first current mirror circuit converts a difference between the first and second output voltages into the first voltage signal that is proportional to the operating temperature. The third circuitry may further comprise a second current mirror circuit with a third input coupled to receive the second output voltage from the first circuitry. The fourth circuitry may further comprise a circuit array configured to multiply the second voltage signal by one of the plurality of selectable scalar factors to produce the scaled voltage signal. The fifth circuitry may further comprise a first ring oscillator configured to convert the first voltage signal that is proportional to the operating temperature to a first frequency-based signal, a first counter configured to convert the first frequency-based signal to a first digital bit value, a second ring oscillator configured to convert the scaled voltage signal to a second frequency-based signal, a second counter configured to convert the second frequency-based signal to a second digital bit value, and circuitry configured to compare the first and second digital bit values. In the foregoing aspects, the first and second ring oscillators may be the same ring oscillator, and the first and second counters may be the same counter. The fifth circuitry may further comprise sixth circuitry configured to multiply the second voltage signal by an increment of one of the plurality of selectable scalar factors when the first and second digital bit values do not match. The fifth circuitry may further comprise circuitry configured to output the temperature when the first and second digital bit values substantially match. The first circuitry may further comprise a first set of one or more diodes having a first emitter injection area, the first set of the one or more diodes outputting the first output voltage; and a second set of one or more diodes having a second emitter injection area. The first circuitry may further comprise second set of the one or more diodes outputting the second output voltage, wherein the second emitter injection area is greater than the first emitter injection area.

Aspects of the present invention further disclose a method for determining a temperature of a location in an integrated circuit, comprising converting a first voltage signal that is proportional to the temperature to a first frequency-based signal, converting the first frequency-based signal to a first digital bit value, applying a first scalar factor to a second voltage signal that is inversely proportional to the temperature to produce a first scaled voltage signal, wherein the first and second voltage signals are generated from first and second voltages outputted by circuitry resident at the location in the integrated circuit, converting the first scaled voltage signal to a second frequency-based signal, converting the second frequency-based signal to a second digital bit value, comparing the first and second digital bit values, and outputting the temperature when the first and second digital bit values substantially match. The method may further comprise applying a second scalar factor to the second voltage signal that is inversely proportional to the temperature to produce a second scaled voltage signal when the first and second digital bit values do not substantially match, converting the second scaled voltage signal to a third frequency-based signal, converting the third frequency-based signal to a third digital bit value, comparing the first and third digital bit values, and outputting the temperature when the first and third digital bit values substantially match. In some foregoing aspects, the first voltage signal that is proportional to the temperature is a difference between the first and second voltages. In some foregoing aspects, the outputting of the temperature further comprises determining the temperature that corresponds to the applied first scalar factor. In some foregoing aspects, the outputting of the temperature further comprises determining the temperature that corresponds to the applied second scalar factor.

Aspects of the present invention further disclose a system for determining a temperature of a location in an integrated circuit, comprising a first set of circuit elements outputting a first output voltage; and a second set of circuit elements outputting a second output voltage, wherein the first and second sets of circuit elements are resident at the location in the integrated circuit, wherein the first and second output voltages independently vary as a function of an operating temperature of the integrated circuit at the location, wherein the first and second output voltages are not equal; a first current mirror circuit with a first input coupled to receive the first output voltage and a second input coupled to receive the second output voltage, wherein the first current mirror circuit converts a difference between the first and second output voltages into a first voltage signal that is proportional to the operating temperature; a second current mirror circuit with a third input coupled to receive the second output voltage, wherein the second current mirror circuit further comprises a circuit array configured to multiply the second voltage signal by one of a plurality of selectable scalar factors to produce a scaled voltage signal that is inversely proportional to the operating temperature; and circuitry configured to determine the temperature of the location in the integrated circuit when the scaled voltage signal is substantially equal to the first voltage signal. The circuitry configured to determine the temperature of the location in the integrated circuit when the scaled voltage signal is substantially equal to the first voltage signal may further comprise a first ring oscillator configured to convert the first voltage signal that is proportional to the operating temperature to a first frequency-based signal, a first counter configured to convert the first frequency-based signal to a first digital bit value, a second ring oscillator configured to convert the scaled voltage signal to a second frequency-based signal, a second counter configured to convert the second frequency-based signal to a second digital bit value, and circuitry configured to compare the first and second digital bit values. In the foregoing aspects, the first and second ring oscillators may be the same ring oscillator, and the first and second counters may be the same counter. The circuitry configured to determine the temperature of the location in the integrated circuit when the scaled voltage signal is substantially equal to the first voltage signal may further comprise circuitry configured to cause the circuit array to multiply the second voltage signal by an increment of one of the plurality of selectable scalar factors when the first and second digital bit values do not match. The circuitry configured to determine the temperature of the location in the integrated circuit when the scaled voltage signal is substantially equal to the first voltage signal may further comprise circuitry configured to output the temperature when the first and second digital bit values substantially match. The first set of circuit elements may further comprise a first set of one or more diodes having a first emitter injection area, the first set of the one or more diodes outputting the first output voltage, and the second set of circuit elements may further comprise a second set of one or more diodes having a second emitter injection area, the second set of the one or more diodes outputting the second output voltage, wherein the second emitter injection area is greater than the first emitter injection area. The circuitry configured to determine the temperature of the location in the integrated circuit when the scaled voltage signal is substantially equal to the first voltage signal may further comprise circuitry for determining the temperature that corresponds to the one of the plurality of selectable scalar factors that produces the scaled voltage signal that is substantially equal to the first voltage signal.

While these exemplary embodiments and aspects are described in sufficient detail to enable those skilled in the art to practice the invention, it should be understood that other embodiments may be realized and that various changes to the invention may be made without departing from the spirit and scope of the present invention. Thus, the previous more detailed description is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Though embodiments of the present invention are described utilizing PFETs, n-channel FETs ("NFETs") could also be utilized by inverting the received selection signals. Naturally, other equivalent switching devices could also be utilized.

Within this description and the claims, the singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuitry," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages.

Figure 7:
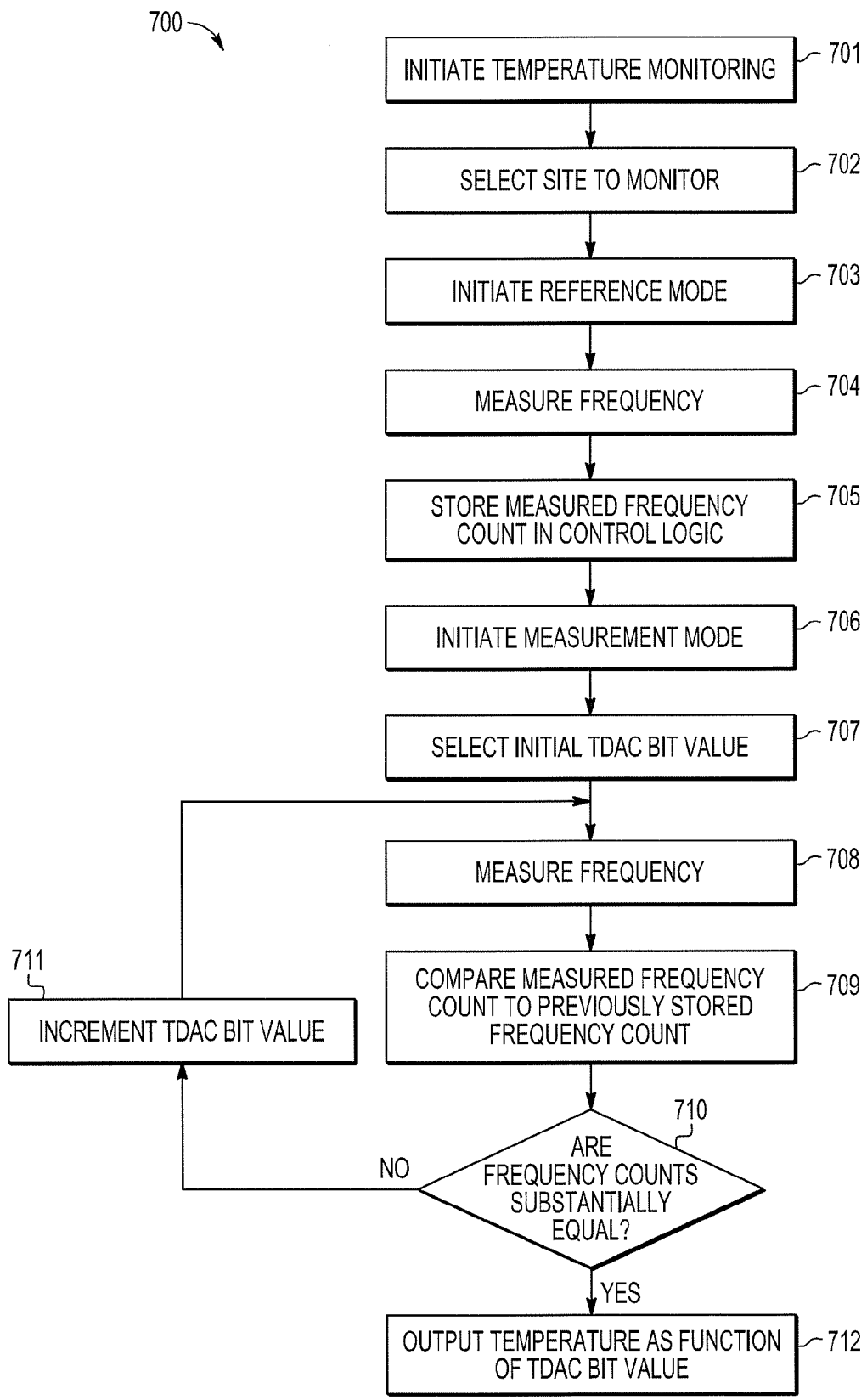
FIG. 7 illustrates a flow diagram configured in accordance with embodiments of the present invention.
Figure 11:
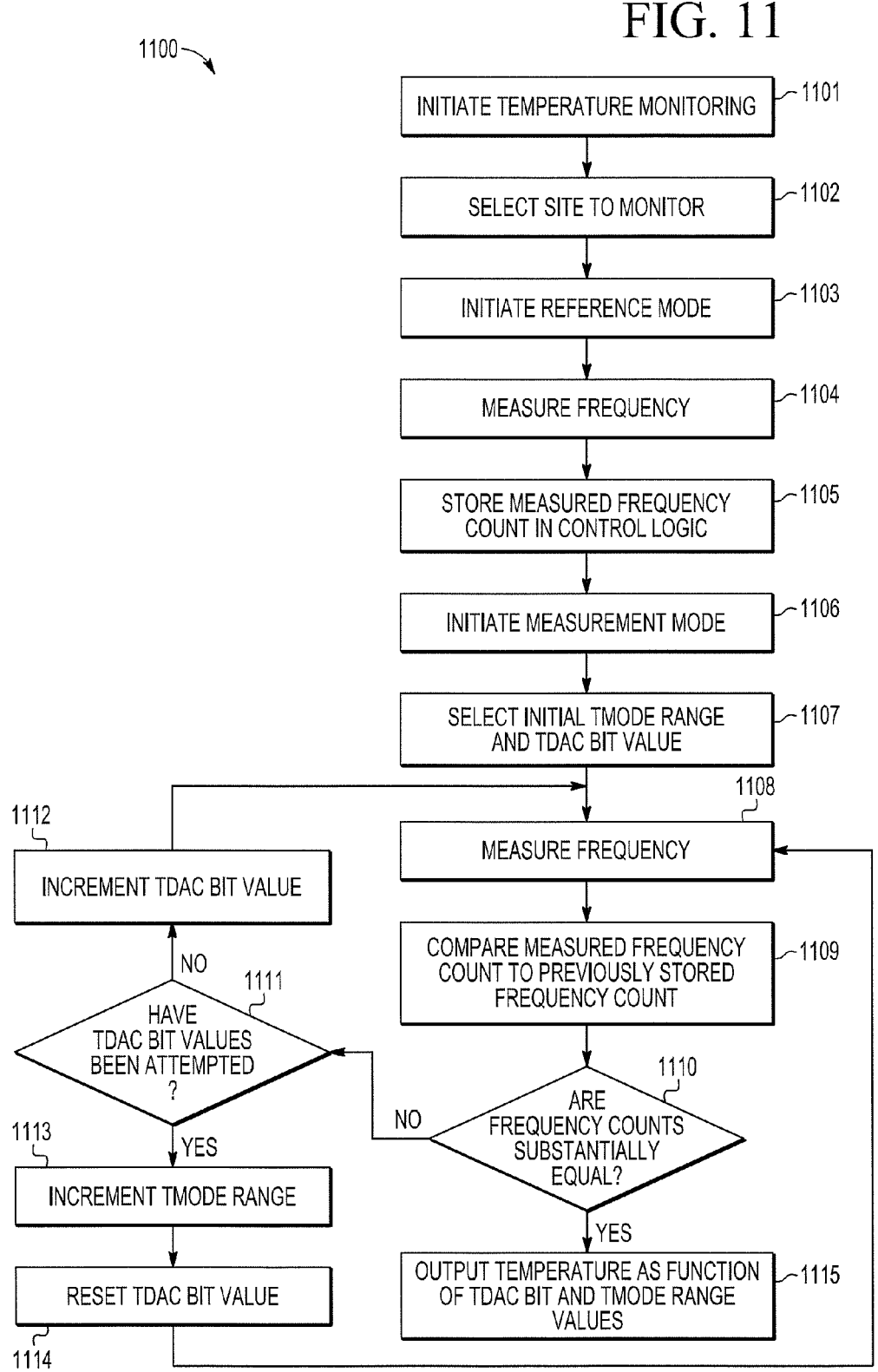
FIG. 11 illustrates a flow diagram configured in accordance with alternative embodiments of the present invention.

Aspects of the present invention are described herein with reference to flowchart illustrations and/or block diagrams of methods, apparatus (systems), and computer program products according to embodiments of the invention (e.g., the flow diagrams illustrated in FIGS. 7 and 11 implemented with the control logic blocks 418 and 918, respectively). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create circuitry configured to implement the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A system for determining a temperature of a location in an integrated circuit, comprising:
   first circuitry, in proximity to the location in the integrated circuit, configured to adjust first and second output voltages as a function of its operating temperature;
   second circuitry configured to convert the first and second output voltages to a first voltage signal that is proportional to the operating temperature, the second circuitry comprising a first current mirror circuit with a first input coupled to receive the first output voltage from the first circuitry and a second input coupled to receive the second output voltage from the first circuitry, wherein the first current mirror circuit converts a difference between the first and second output voltages into the first voltage signal that is proportional to the operating temperature;
   third circuitry configured to convert the second output voltage to a second voltage signal that is inversely proportional to the operating temperature;
   fourth circuitry configured to apply one of a plurality of selectable scalar factors to the second voltage signal to produce a scaled voltage signal; and
   fifth circuitry configured to determine the temperature of the location in the integrated circuit when the scaled voltage signal is substantially equal to the first voltage signal.

2. The system as recited in claim 1, wherein the third circuitry further comprises a second current mirror circuit with a third input coupled to receive the second output voltage from the first circuitry, wherein the fourth circuitry further comprises a circuit array configured to multiply the second voltage signal by one of the plurality of selectable scalar factors to produce the scaled voltage signal.

3. The system as recited in claim 2, wherein the fifth circuitry further comprises:
   a first ring oscillator configured to convert the first voltage signal that is proportional to the operating temperature to a first frequency-based signal;
   a first counter configured to convert the first frequency-based signal to a first digital bit value;

a second ring oscillator configured to convert the scaled voltage signal to a second frequency-based signal;

a second counter configured to convert the second frequency-based signal to a second digital bit value; and circuitry configured to compare the first and second digital bit values.

4. The system as recited in claim 2, wherein the fifth circuitry further comprises sixth circuitry configured to multiply the second voltage signal by an increment of one of the plurality of selectable scalar factors when the first and second digital bit values do not match.

5. The system as recited in claim 3, wherein the fifth circuitry further comprises circuitry configured to output the temperature when the first and second digital bit values substantially match.

6. The system as recited in claim 3, wherein the first and second ring oscillators are the same ring oscillator, and wherein the first and second counters are the same counter.

7. The system as recited in claim 1, wherein the first circuitry further comprises:

a first set of one or more diodes having a first emitter injection area, the first set of the one or more diodes outputting the first output voltage; and a second set of one or more diodes having a second emitter injection area, the second set of the one or more diodes outputting the second output voltage, wherein the second emitter injection area is greater than the first emitter injection area.

8. A method for determining a temperature of a location in an integrated circuit, comprising:

converting a first voltage signal that is proportional to the temperature to a first frequency-based signal;

converting the first frequency-based signal to a first digital bit value;

applying a first scalar factor to a second voltage signal that is inversely proportional to the temperature to produce a first scaled voltage signal, wherein the first and second voltage signals are generated from first and second voltages outputted by circuitry resident at the location in the integrated circuit;

converting the first scaled voltage signal to a second frequency-based signal;

converting the second frequency-based signal to a second digital bit value;

comparing the first and second digital bit values; and outputting the temperature when the first and second digital bit values substantially match.

9. The method as recited in claim 8, further comprising:

applying a second scalar factor to the second voltage signal that is inversely proportional to the temperature to produce a second scaled voltage signal when the first and second digital bit values do not substantially match;

converting the second scaled voltage signal to a third frequency-based signal;

converting the third frequency-based signal to a third digital bit value;

comparing the first and third digital bit values; and outputting the temperature when the first and third digital bit values substantially match.

10. The method as recited in claim 8, wherein the first voltage signal that is proportional to the temperature is a difference between the first and second voltages.

11. The method as recited in claim 8, wherein the outputting of the temperature further comprises determining the temperature that corresponds to the applied first scalar factor.

12. The method as recited in claim 9, wherein the outputting of the temperature further comprises determining the temperature that corresponds to the applied second scalar factor.

13. A system for determining a temperature of a location in an integrated circuit, comprising:

a first set of circuit elements outputting a first output voltage;

a second set of circuit elements outputting a second output voltage, wherein the first and second sets of circuit elements are resident at the location in the integrated circuit, wherein the first and second output voltages independently vary as a function of an operating temperature of the integrated circuit at the location, wherein the first and second output voltages are not equal;

a first current mirror circuit with a first input coupled to receive the first output voltage and a second input coupled to receive the second output voltage, wherein the first current mirror circuit converts a difference between the first and second output voltages into a first voltage signal that is proportional to the operating temperature;

a second current mirror circuit with a third input coupled to receive the second output voltage, wherein the second current mirror circuit further comprises a circuit array configured to multiply the second voltage by one of a plurality of selectable scalar factors to produce a scaled voltage signal that is inversely proportional to the operating temperature; and circuitry configured to determine the temperature of the location in the integrated circuit when the scaled voltage signal is substantially equal to the first voltage signal.

14. The system as recited in claim 13, wherein the circuitry configured to determine the temperature of the location in the integrated circuit when the scaled voltage signal is substantially equal to the first voltage signal further comprises:

a first ring oscillator configured to convert the first voltage signal that is proportional to the operating temperature to a first frequency-based signal;

a first counter configured to convert the first frequency-based signal to a first digital bit value;

a second ring oscillator configured to convert the scaled voltage signal to a second frequency-based signal;

a second counter configured to convert the second frequency-based signal to a second digital bit value; and circuitry configured to compare the first and second digital bit values.

15. The system as recited in claim 14, wherein the circuitry configured to determine the temperature of the location in the integrated circuit when the scaled voltage signal is substantially equal to the first voltage signal further comprises circuitry configured to cause the circuit array to multiply the second voltage by an increment of one of the plurality of selectable scalar factors when the first and second digital bit values do not match.

16. The system as recited in claim 15, wherein the circuitry configured to determine the temperature of the location in the integrated circuit when the scaled voltage signal is substantially equal to the first voltage signal further comprises circuitry configured to output the temperature when the first and second digital bit values substantially match.

17. The system as recited in claim 14, wherein the first and second ring oscillators are the same ring oscillator, and wherein the first and second counters are the same counter.

18. The system as recited in claim 13, wherein the first set of circuit elements further comprises a first set of one or more diodes having a first emitter injection area, the first set of the one or more diodes outputting the first output voltage, wherein the second set of circuit elements further comprises a second set of one or more diodes having a second emitter injection area, the second set of the one or more diodes outputting the second output voltage, wherein the second emitter injection area is greater than the first emitter injection area.

19. The system as recited in claim 13, wherein the circuitry configured to determine the temperature of the location in the integrated circuit when the scaled voltage signal is substantially equal to the first voltage signal further comprises circuitry for determining the temperature that corresponds to the one of the plurality of selectable scalar factors that produces the scaled voltage signal that is substantially equal to the first voltage signal.

* * * * *